(12) United States Patent
Prakash et al.

(10) Patent No.: US 9,386,441 B2
(45) Date of Patent: Jul. 5, 2016

(54) FEMTOCELL MESSAGE DELIVERY AND NETWORK PLANNING

(71) Applicant: QUALCOMM Incorporated, San Diego, CA (US)

(72) Inventors: Rajat Prakash, San Diego, CA (US); Christophe Chevallier, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 198 days.

(21) Appl. No.: 14/027,098

(22) Filed: Sep. 13, 2013

(65) Prior Publication Data

US 2015/0079983 A1  Mar. 19, 2015

(51) Int. Cl.

| H04W 4/00 | (2009.01) |
|---|---|
| H04W 8/18 | (2009.01) |
| H04W 60/00 | (2009.01) |
| H04W 12/08 | (2009.01) |
| H04W 48/02 | (2009.01) |
| H04W 48/08 | (2009.01) |
| H04W 84/04 | (2009.01) |
| H04W 4/02 | (2009.01) |
| H04W 4/14 | (2009.01) |
| H04W 60/04 | (2009.01) |

(52) U.S. Cl.
CPC ............... *H04W 8/186* (2013.01); *H04W 4/025* (2013.01); *H04W 4/14* (2013.01); *H04W 12/08* (2013.01); *H04W 48/02* (2013.01); *H04W 48/08* (2013.01); *H04W 60/00* (2013.01); *H04W 60/04* (2013.01); *H04W 84/045* (2013.01)

(58) Field of Classification Search
CPC ..... H04W 8/186; H04W 12/08; H04W 48/02; H04W 48/08; H04W 60/00; H04W 84/045
USPC ........................................................ 455/435.1
See application file for complete search history.

(56) References Cited

U.S. PATENT DOCUMENTS

| 8,396,489 | B2 | 3/2013 | Platt et al. |
|---|---|---|---|
| 8,983,462 | B2 | 3/2015 | Buchmayer et al. |
| 9,043,928 | B1 * | 5/2015 | Paczkowski ............ H04L 63/10 713/1 |
| 2002/0188868 | A1 | 12/2002 | Budka et al. |

(Continued)

FOREIGN PATENT DOCUMENTS

| EP | 2276280 A1 | 1/2011 |
|---|---|---|
| EP | 2530959 A1 | 12/2012 |

OTHER PUBLICATIONS

International Search Report and Written Opinion—PCT/US2014/055036—ISA/EPO—May 1, 2015.

*Primary Examiner* — Amancio Gonzalez
(74) *Attorney, Agent, or Firm* — Arent Fox LLP

(57) ABSTRACT

Techniques for femtocell message delivery and network planning are described herein. A mobile device sends a registration request to an access point, such as a femtocell access point. If denied registration, the mobile device may return to service by a macro cell access point. A network entity, such as a femtocell gateway serving the access point, may determine an identification of the mobile device. The network entity may send the identification of mobile device and an identifier of the access point to an application server. The application server may create and send a targeted message to the mobile device based on the identification of mobile device and the identifier of the access point. The application server may determine a user count for the access point and facilitate network planning based on the user count.

14 Claims, 13 Drawing Sheets

(56) References Cited

U.S. PATENT DOCUMENTS

| | | |
|---|---|---|
| 2005/0041648 A1 | 2/2005 | Bharatia et al. |
| 2005/0221795 A1 | 10/2005 | Hirabe et al. |
| 2007/0281692 A1 | 12/2007 | Bucher et al. |
| 2009/0093232 A1 | 4/2009 | Gupta et al. |
| 2010/0122338 A1* | 5/2010 | Kataoka et al. ............... 726/12 |
| 2012/0316938 A1 | 12/2012 | Moshfeghi |
| 2015/0148035 A1* | 5/2015 | Buchmayer et al. ........ 455/434 |
| 2015/0382180 A1 | 12/2015 | Prakash |

* cited by examiner

FEMTOCELL MESSAGE DELIVERY AND NETWORK PLANNING

BACKGROUND

Aspects of the present disclosure relate generally to wireless communication systems, and more particularly to message delivery and network planning.

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices (e.g., which can be commonly referred to as mobile phones, tablet computers, or mobile computers, collectively referred to as access terminals (AT), user equipment (UE), etc.). Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional small cells can be deployed to provide more robust wireless coverage to mobile devices. Small cells are low power base stations which transmit at a lower power than macro cells and have smaller coverage than macro cells. For example, small cells (e.g., which can be commonly referred to as Home NodeBs or Home eNBs, collectively referred to as H(e)NBs, femtocells, femto nodes, femtocell nodes, femtocell access points, pico nodes, micro nodes, etc.) can be deployed for incremental capacity growth, richer user experience, in-building or other specific geographic coverage, and/or the like. In some configurations, such small cells are connected to the Internet via broadband connection (e.g., digital subscriber line (DSL) router, cable or other modem, etc.), which can provide the backhaul link to the mobile operator's network. In this regard, small cells are often deployed in homes, offices, etc. without consideration of a current network environment.

Some small cells are not open for public access and will not serve unauthorized mobile devices. Such private small cells are often installed in areas with a significant amount of traffic from users of unauthorized mobile device. It is still desirable to send informational or marketing messages to users of the unauthorized mobile devices. Preferably, the informational or marketing messages are created to be relevant to the users sent to. In addition, network load for macro cells and small cells may be better matched with available network capacity by obtaining user density for specific areas. Therefore, it is also desirable to obtain information regarding the unauthorized mobile devices to facilitate network planning decisions.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In accordance with one or more aspects of the implementations described herein, there is provided a system and method for femtocell message delivery and network planning. In one implementation, a network entity may receive a registration request for a mobile device to an access point. The network entity may determine an identification of the mobile device based at least in part on information in the registration request. The network entity may instruct the access point to deny the registration request, in response to the identification not being included in a list of identifications for mobile devices allowed to access the access point.

In a second implementation, an application server may receive, from a network entity, an identification of a mobile device that was denied a registration request to an access point. The application server may receive an identifier of the access point from the network entity. The application server may create a targeted message for the mobile device based at least in part on the identifier. The application server may provide the targeted message to the mobile device specified by the identification.

In a third implementation, an application server may receive, from a network entity, an identification of a mobile device that was denied a registration request to an access point. The application server may receive an identifier of the access point from the network entity. The application server may determine a user count for the access point based at least in part on the identification and the identifier.

In a fourth implementation, a mobile device may send a registration request to an access point. The mobile device may receive an indication of denial of the registration request, in response to the identification not being included in a list of identifications for mobile devices allowed to access the access point. The mobile device may receive a targeted message from an application server, in response to receiving the indication, the targeted message based at least in part on an identifier of the access point.

DETAILED DESCRIPTION

Figure 1:
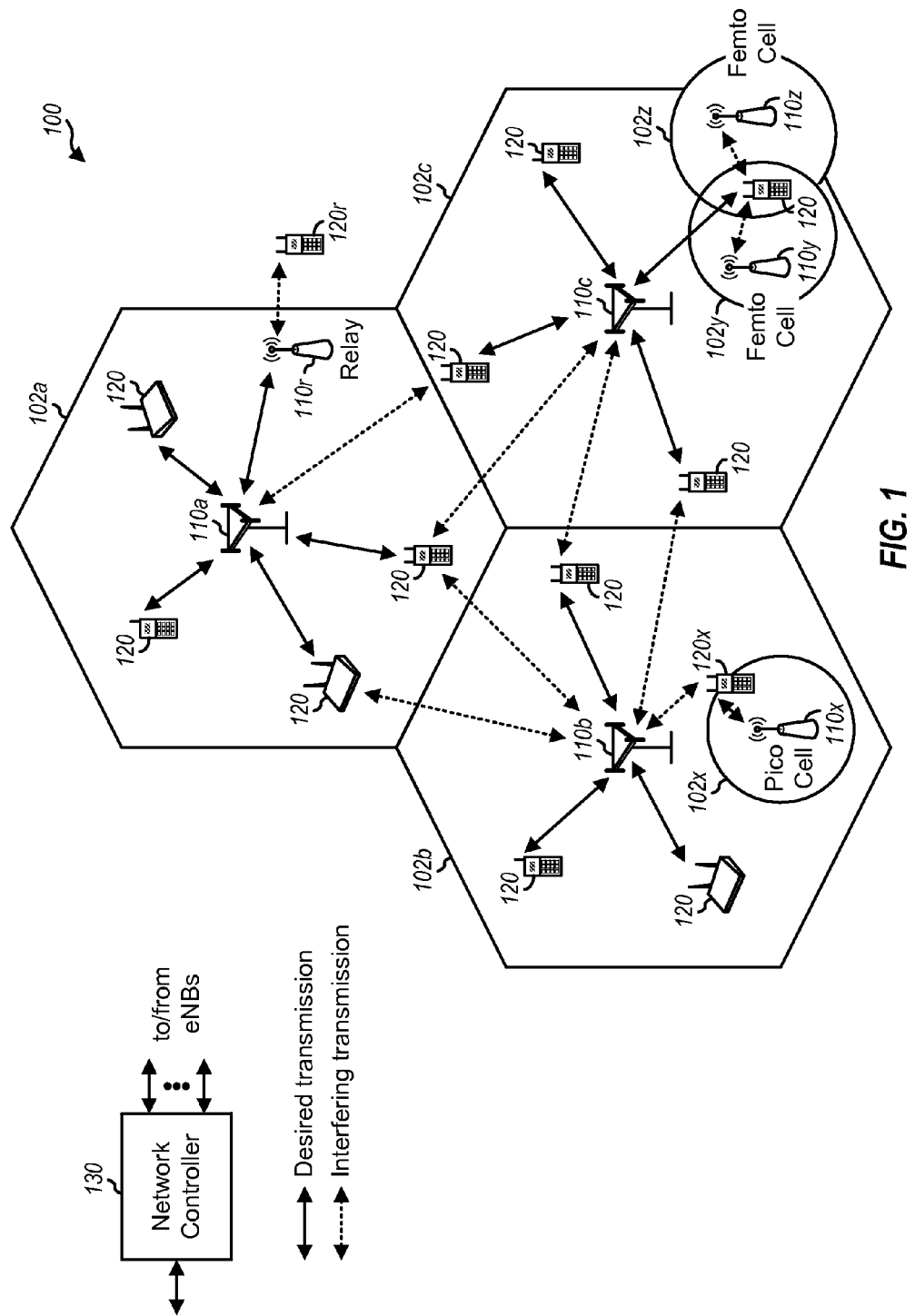
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The subject disclosure provides a method of sending informational or marketing messages to users of unauthorized mobile devices. Some small cells only allow private access and only serve authorized mobile devices, but are often installed in areas with a significant amount of traffic from users of unauthorized mobile device. An application server may create and send a targeted message to the unauthorized mobile device based on an identification of mobile device and an identifier of an access point serving the mobile device. The informational or marketing messages may be created to be relevant to the users of those unauthorized mobile devices.

The subject disclosure also provides a method of network planning to better match network load for macro cells and small cells with available network capacity by obtaining user density for specific areas.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by user equipment (UE) with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
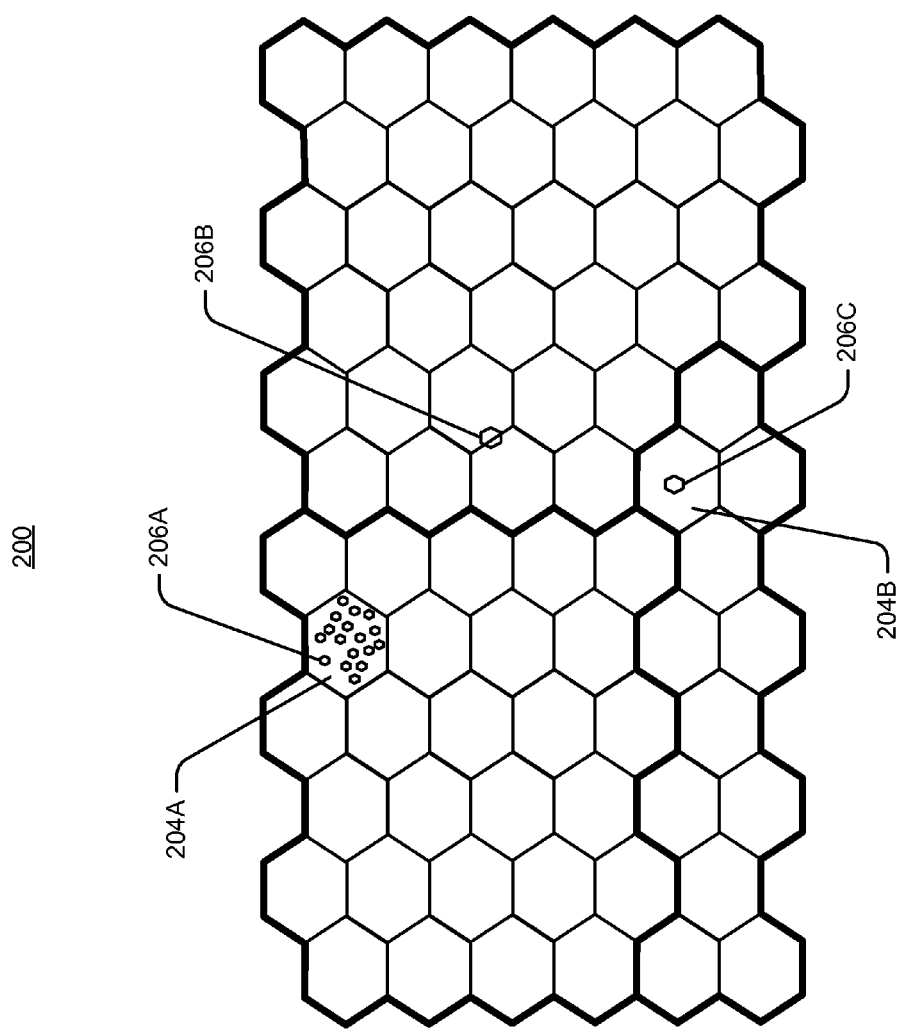
FIG. 2 is a simplified diagram illustrating sample coverage areas for wireless communication.

FIG. 2 is a simplified diagram illustrating sample coverage areas for wireless communication. Some access points provide macro coverage and other access points provide smaller coverage. Here, macro coverage areas 204 may be provided by, for example, macro access points of a large area cellular network such as a 3G network, typically referred to as a macro cell network or a wide area network ("WAN"). In addition, smaller coverage areas 206 may be provided by, for example, access points of a residence-based or building-based network environment, typically referred to as a local area network ("LAN"). As indicated by the small cells (e.g., coverage area 206A) in the macro coverage area 204A, a large number of small coverage access points may deployed in a given area of a network. As a mobile device moves through such a network, the mobile device may be served in certain locations by access points that provide macro coverage while the mobile device may be served at other locations by access points that provide smaller coverage. In some aspects, the smaller coverage access points may be used to provide incremental capacity growth, in-building coverage, and different services, all leading to a more robust user experience.

Figure 3:
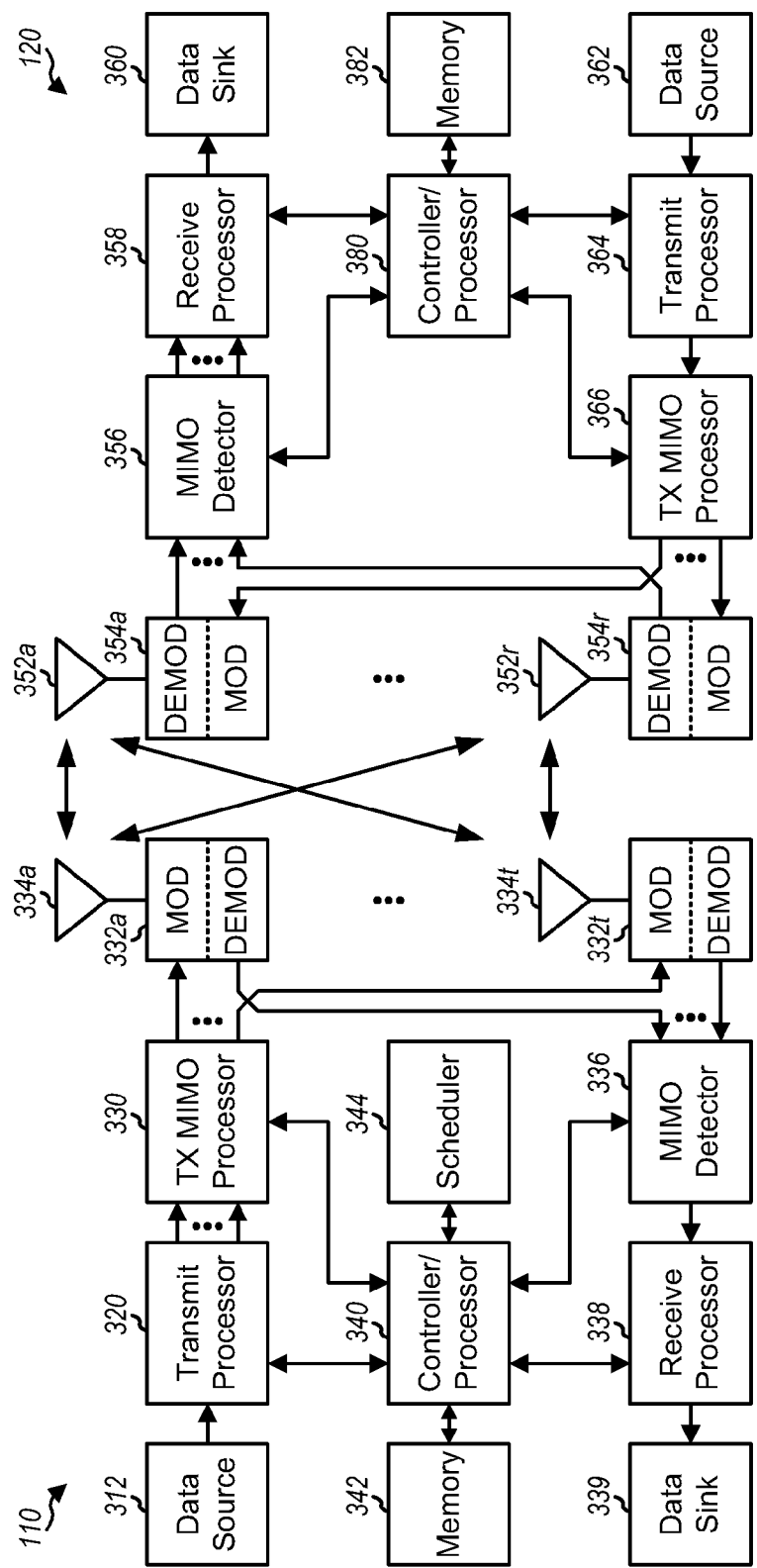
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE-MODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. The processor 380 may include modules for performing operations of the methods described herein, by executing instructions held in the memory 382. Such modules may include, for example, modules for measuring data quality, sensing resource constraints, and providing control signals in a control channel for transmitting to the eNB 110.

On the uplink, at the UE 120, a transmit processor 364 may receive and process data (e.g., for the Physical Uplink Shared Channel (PUSCH)) from a data source 362 and control information (e.g., for the Physical Uplink Control Channel (PUCCH)) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. For example, the processor 380 and/or other processors and modules at the UE 120 may perform or direct the execution of the blocks illustrated in FIG. 13, and/or other processes for the techniques described herein. The UE 120 may include one or more of the components as shown and described in connection with FIG. 13. The memories 342 and 382 may store data and program codes for the base station 110 and the UE 120, respectively. A scheduler 344 may schedule UEs for data transmission on the downlink and/or uplink.

Figure 4:
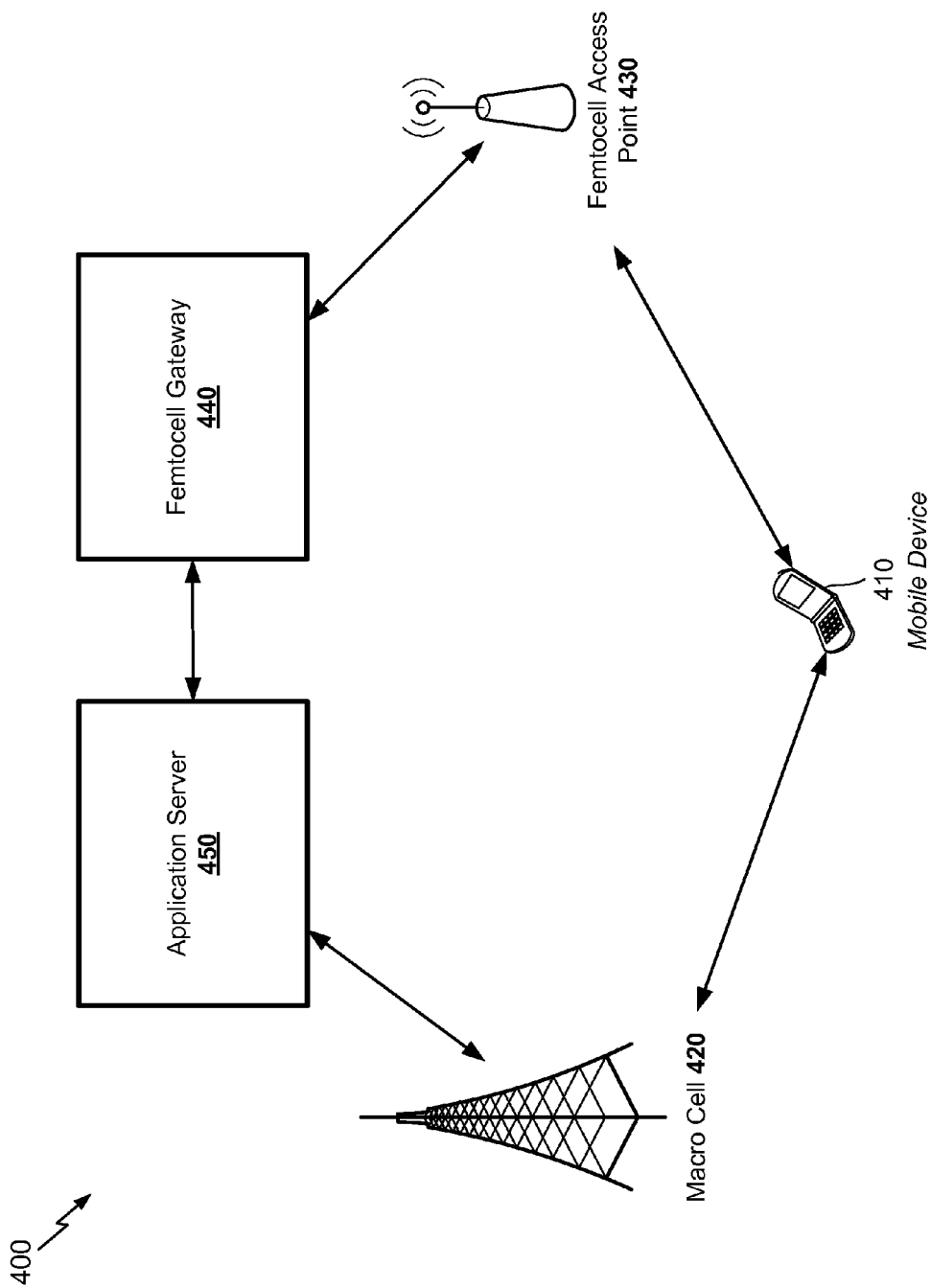
FIG. 4 illustrates an exemplary system for femtocell message delivery and network planning.

In accordance with one or more aspects of the implementations described herein, FIG. 4 illustrates an exemplary system for femtocell message delivery and network planning. In one implementation, small cell (e.g. femtocell) access points 430 may be installed to provide service to homes, shops, malls, public transportation, pedestrian walkways, or other such areas frequented by mobile device users. For example, the femtocell access points 430 may allow connection only for mobile devices of employees of a business, or members of an organization.

In an exemplary implementation, users carrying mobile devices 410 may enter and exit a vicinity of the femtocell access points 430. A mobile device 410 within range of the femtocell access point 430 may attempt to register with the femtocell access point 430 by sending a registration request. However, the mobile device 410 may not be authorized to connect to the femtocell access point 430. For example, the mobile device 410 may not be included in a closed subscriber group (CSG) of authorized mobile devices for the femtocell access point 430.

In an exemplary implementation, a network entity 440, in communication with the femtocell access point 430, may receive the registration request from the mobile device 410. For example, the network entity 440 may be a femtocell gateway, which may include a security gateway which terminates encrypted Internet Protocol (IP) data connections from a plurality of femtocell access points and may include a signaling gateway that aggregates and validates signaling traffic, authenticates each femtocell access point, and interfaces with the wireless network. The femtocell gateway 440 may instruct the femtocell access point 430 to deny the registration request. The mobile device 410, in response to being denied registration to the femtocell access point 430, may return to service by a macro cell 420.

In an exemplary implementation, the registration request may allow the femtocell gateway 440 to determine an identification of the mobile device 410. The femtocell gateway 440 may send the identification information the mobile device 410 that was denied registration to an application server 450. In a related aspect, the identification of the mobile device may include an IP address or phone number for the mobile device 410. In another related aspect, the identification of the mobile device 410 may allow an application server 450 to determine the IP address or phone number of the mobile device 410, based at least in part on the identification of the mobile device.

In an exemplary implementation, the femtocell gateway 440 may send an identifier of the femtocell access point 430 to the application server 450. In a related aspect, the application server 450 may create a targeted message for the mobile device 410 based at least in part on the identifier of the femtocell access point 430. For example, if the femtocell access point 430 is one owned by a retail business, the application server 450 may create a targeted message including advertising related to the retail business. In another example, if the femtocell access point 430 is on owned by a public transportation facility, the application server 450 may create a targeted message including train schedules related to the public transportation facility.

In an exemplary implementation, the application server 450 may use the IP address of the mobile device to send the targeted message via a packet data message to the mobile device 410. In another exemplary implementation, the application server 450 may use the phone number of the mobile device to send a the targeted message via a Short Message Service (SMS) message or Multimedia Messaging Service (MMS) message to the mobile device 410. The message may travel through the macro cell 420 to the mobile device 410.

In an example implementation, the application server 450 may use the identification of the mobile device 410 along with the identifier of the femtocell access point 430 to determine a user count for the femtocell access point 430. In a related aspect, the application server 450 may determine whether to deploy additional cells to improve capacity and coverage in a given area, based on the user count. In another related aspect, the application server 450 may determine whether to open private small cell base stations for public access, based on the user count.

Figure 5:
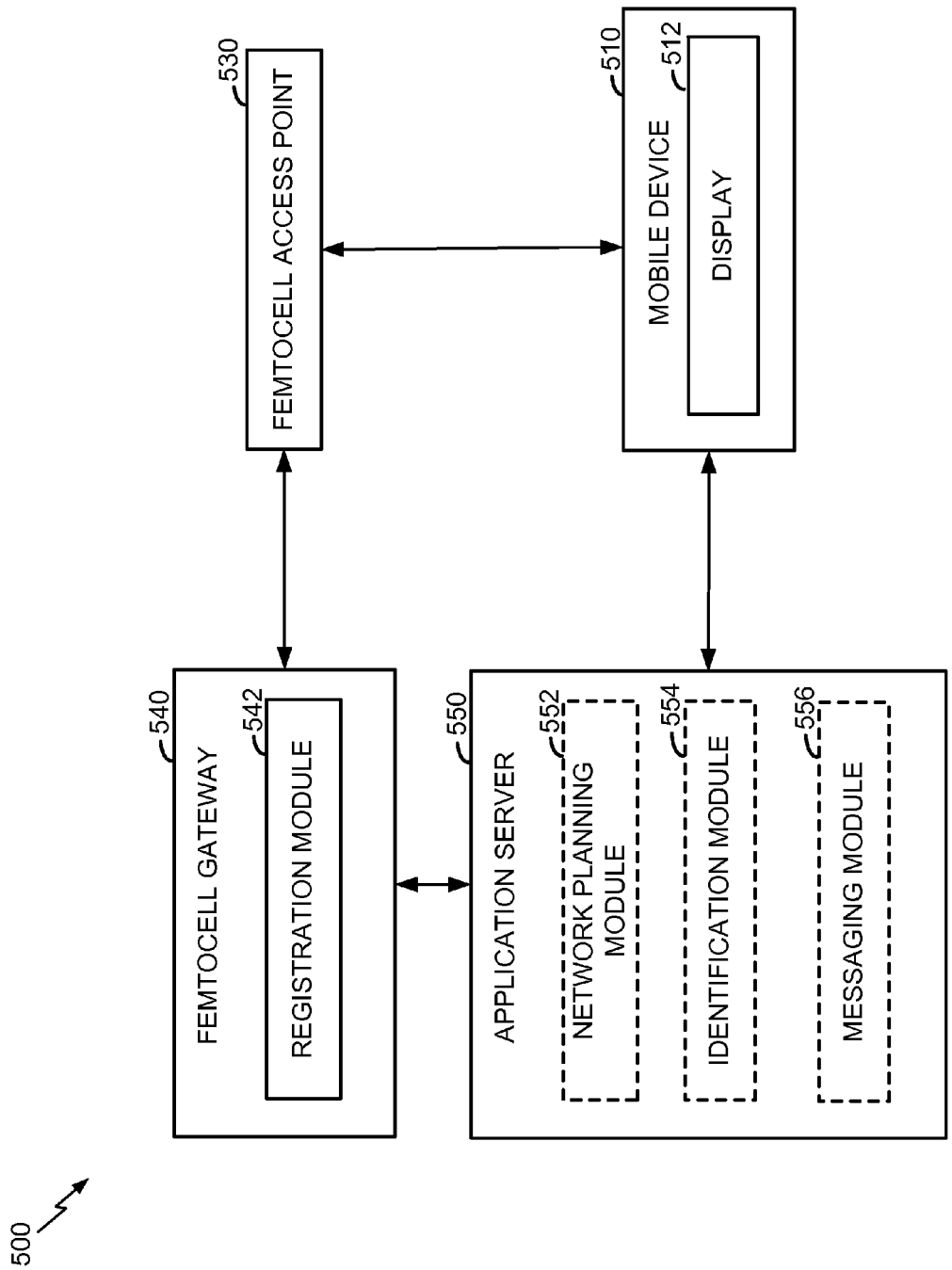
FIG. 5 is a block diagram conceptually illustrating a design of a femtocell gateway, a femtocell access point, an application server, and a mobile device according to aspects of the present disclosure.

FIG. 5 is a block diagram conceptually illustrating a design of a femtocell gateway, a femtocell access point, an application server, and a mobile device according to aspects of the present disclosure. A mobile device 510 may wirelessly communicate with a femtocell access point 530 and an application server 550. The mobile device may include a display 512 to display messages sent from the application server 550.

The femtocell access point 530 may communicate with the femtocell gateway 540. The femtocell gateway 540 may include a registration module 542 that determines whether to deny the registration request from the mobile device 510 to the femtocell access point 530.

In an example implementation, the application server 550 may communicate with the femtocell gateway 540 and the mobile device 510. In a related aspect, the application server 550 may include an identification module 554 that determines the IP address or phone number of the mobile device 510 based at least in part on the identification of the mobile device. The application server 550 may include a messaging module 556 to create a targeted message to send to the mobile device 510 based at least in part on the identifier of the femtocell access point 530.

In an example implementation, the application server 550 may include a network planning module 552 that determines the user count for the femtocell access point 530. In a related aspect, the Network planning module 552 may whether to deploy additional cells to improve capacity and coverage in a given area, based at least in part on the user count. In another related aspect, the network planning module 552 may determine whether to open private small cell base stations for public access, based at least in part on the user count.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
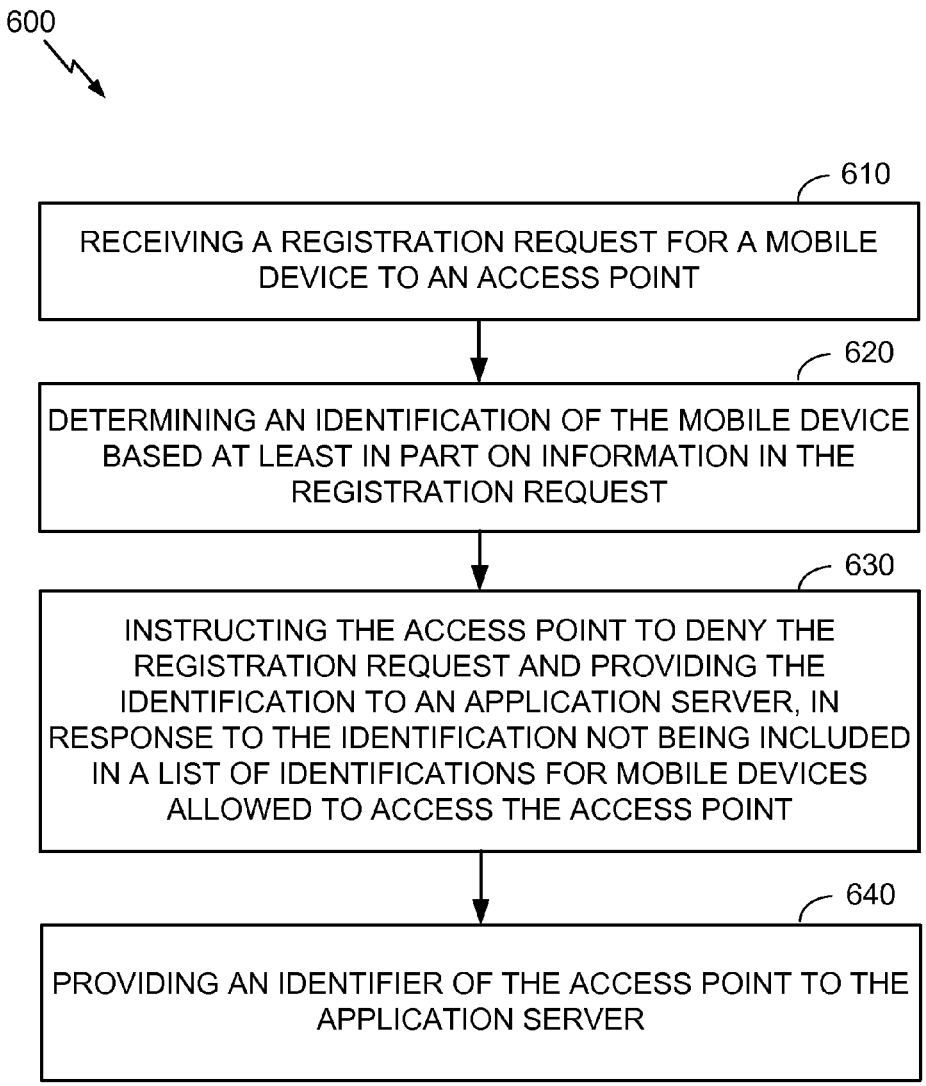
FIG. 6 illustrates aspects of the a first example methodology for femtocell message delivery and network planning.

In accordance with one or more aspects of the implementations described herein, with reference to FIG. 6, there is shown an example methodology 600 for femtocell message delivery and network planning. The method may be operable by a network entity, such as, for example, the femtocell gateway 540, shown in FIG. 5, or the like.

The method 600 may involve, at 610, receiving a registration request for a mobile device to an access point. For example, the femtocell access point 530, shown in FIG. 5, may receive the registration attempt at the antennas 334a through 334t to be processed by the receive processor 338, shown in FIG. 3. The femtocell access point 530 may then relay the registration attempt to the femtocell gateway 540.

The method 600 may involve, at 620, determining an identification of the mobile device based at least in part on information in the registration request. For example, the femtocell gateway 540 may determine an IP address or phone number identifying the mobile device 510, as shown in FIG. 5. In another example, the femtocell gateway 540 may determine other information that may allow the application server 550 to determine the IP address or phone number of the mobile device.

The method 600 may involve, at 630, instructing the access point to deny the registration request and providing the identification to an application server, in response to the identification not being included in a list of identifications for mobile devices allowed to access the access point. For example, the registration module 542 of the femtocell gateway 540 may decide to deny the registration request, as shown in FIG. 5. The access point 530 may instruct the access point 530 to reject the registration request in response to the mobile device 510 not belonging to a CSG of the access point 530. For example, the femtocell gateway 540 may provide the identification of the mobile device 510, including the IP address or phone number of the mobile device, to the application server 550. In another example, the identification of the mobile device 510 may allow the application server 550 to determine the IP address or phone number of the mobile device.

The method 600 may involve, at 650, providing an identifier of the access point to the application server. The identifier of the access point may 530 include a network ID (NID), sector ID (SID) or cell ID (CID) identifying the access point 530, as shown in FIG. 5. In a related aspect, the identifier of the access point 530 and the identification of the mobile device 510 may allow the application server 550 to provide a targeted message to the mobile device based at least in part on the identification and the identifier.

Figure 7:
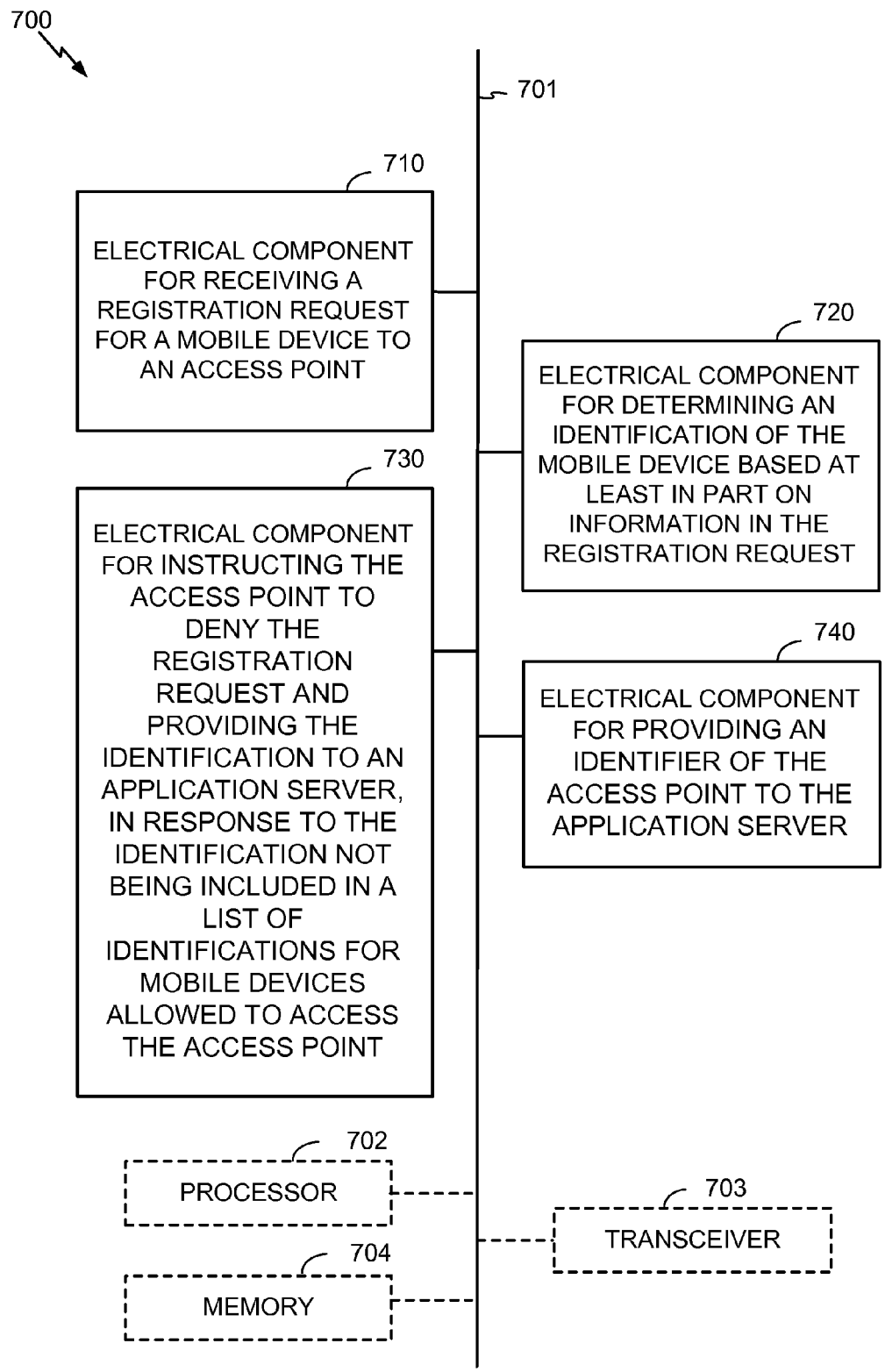
FIG. 7 shows an implementation of an apparatus in accordance with the methodology of FIG. 6.

FIG. 7 shows an implementation of an apparatus in accordance with the methodology of FIG. 6. The exemplary apparatus 700 may be configured as a mobile computing device or as a processor or similar device/component for use within. In one example, the apparatus 700 may include functional blocks that can represent functions implemented by a processor, software, or combination thereof (e.g., firmware). In another example, the apparatus 700 may be a system on a chip (SoC) or similar integrated circuit (IC).

In one implementation, apparatus 700 may include an electrical component or module 710 for receiving a registration request for a mobile device to an access point. The apparatus 700 may include an electrical component 720 for determining an identification of the mobile device based at least in part on information in the registration request. The apparatus 700 may include an electrical component 730 for instructing the access point to deny the registration request, in response to the identification not being included in a list of identifications for mobile devices allowed to access the access point. The apparatus 700 may include an electrical component 740 for providing the identification to an application server, in response to the instruction. The apparatus 700 may include an electrical component 750 for providing an identifier of the access point to the application server.

In further related aspects, the apparatus 700 may optionally include a processor component 702. The processor 702 may be in operative communication with the components 710-750 via a bus 701 or similar communication coupling. The processor 702 may effect initiation and scheduling of the processes or functions performed by electrical components 710-750.

In yet further related aspects, the apparatus 700 may include a radio transceiver component 703. A standalone receiver and/or standalone transmitter may be used in lieu of or in conjunction with the transceiver 703. The apparatus 700 may optionally include a component for storing information, such as, for example, a memory device/component 704. The computer readable medium or the memory component 704 may be operatively coupled to the other components of the apparatus 700 via the bus 701 or the like. The memory component 704 may be adapted to store computer readable instructions and data for affecting the processes and behavior of the components 710-750, and subcomponents thereof, or the processor 702, or the methods disclosed herein. The memory component 704 may retain instructions for executing functions associated with the components 710-750. While shown as being external to the memory 704, it is to be understood that the components 710-750 can exist within the memory 704. It is further noted that the components in FIG. 7 may comprise processors, electronic devices, hardware devices, electronic sub-components, logical circuits, memories, software codes, firmware codes, or the like.

Figure 8:
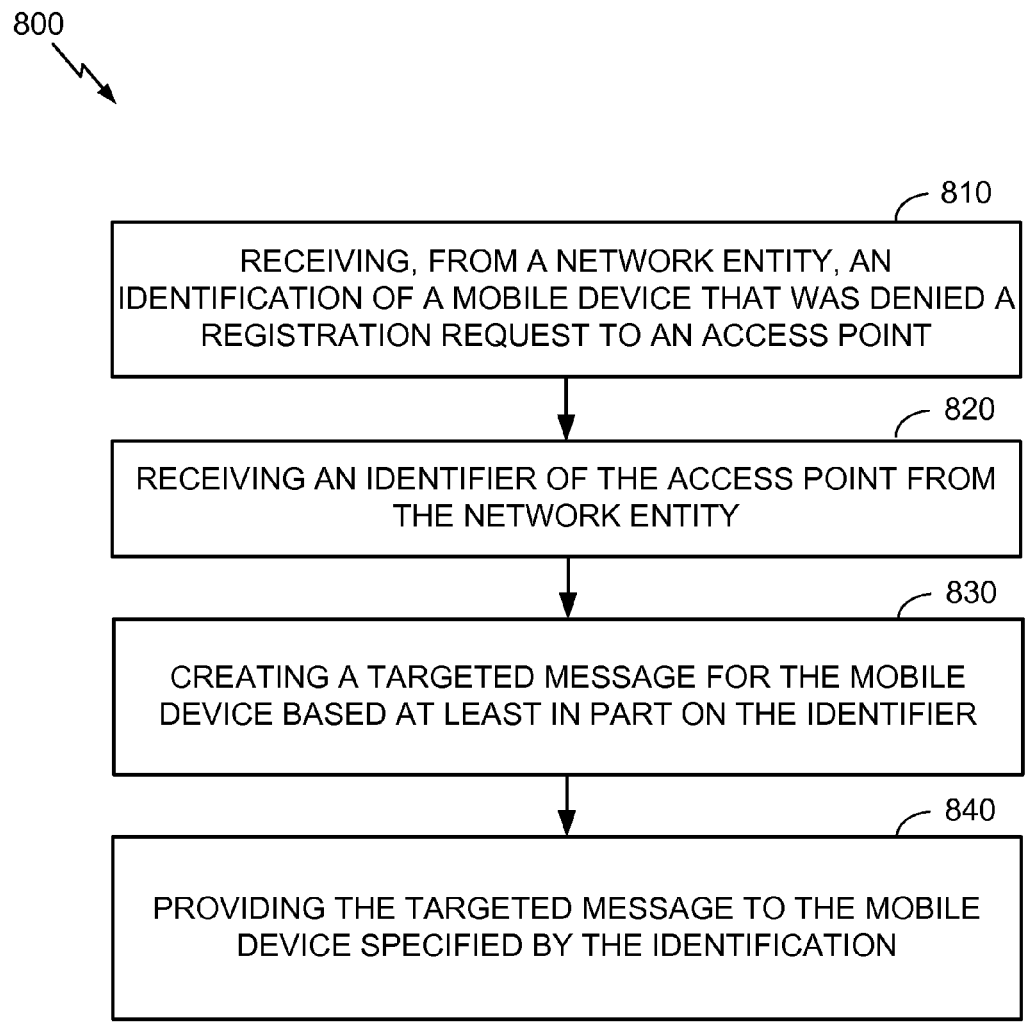
FIG. 8 illustrates aspects of a second example methodology for femtocell message delivery and network planning.

In accordance with one or more aspects of the implementations described herein, with reference to FIG. 8, there is shown a second example methodology for femtocell message delivery and network planning. The method may be operable, such as, for example, by the application server 550, shown in FIG. 5, or the like.

For example, the method 800 may involve, at 810, receiving, from a network entity, an identification of a mobile device that was denied a registration request to an access point. For example, the network entity may be the femtocell gateway 540, shown in FIG. 5. In a related aspect, the identification of the mobile device may include an IP address or phone number identifying the mobile device 510. In another example, the identification of the mobile device may be used by the application server 550 to determine an IP address or phone number identifying the mobile device 510.

The method 800 may involve, at 820, receiving an identifier of the access point from the network entity. The identifier of the access point 530 may include a network ID (MD), sector ID (SID) or cell ID (CID) identifying the access point 530, as shown in FIG. 5.

The method 800 may involve, at 830, creating a targeted message for the mobile device based at least in part on the identifier. For example, the targeted message may vary depending on the access point 530 that denied the registration request, as shown in FIG. 5.

The method 800 may involve, at 840, providing the targeted message to the mobile device specified by the identification. The application server 550 may send the targeted message to the IP address of the mobile device or as a SMS to the phone number of the mobile device, as shown in FIG. 5.

Figure 9:
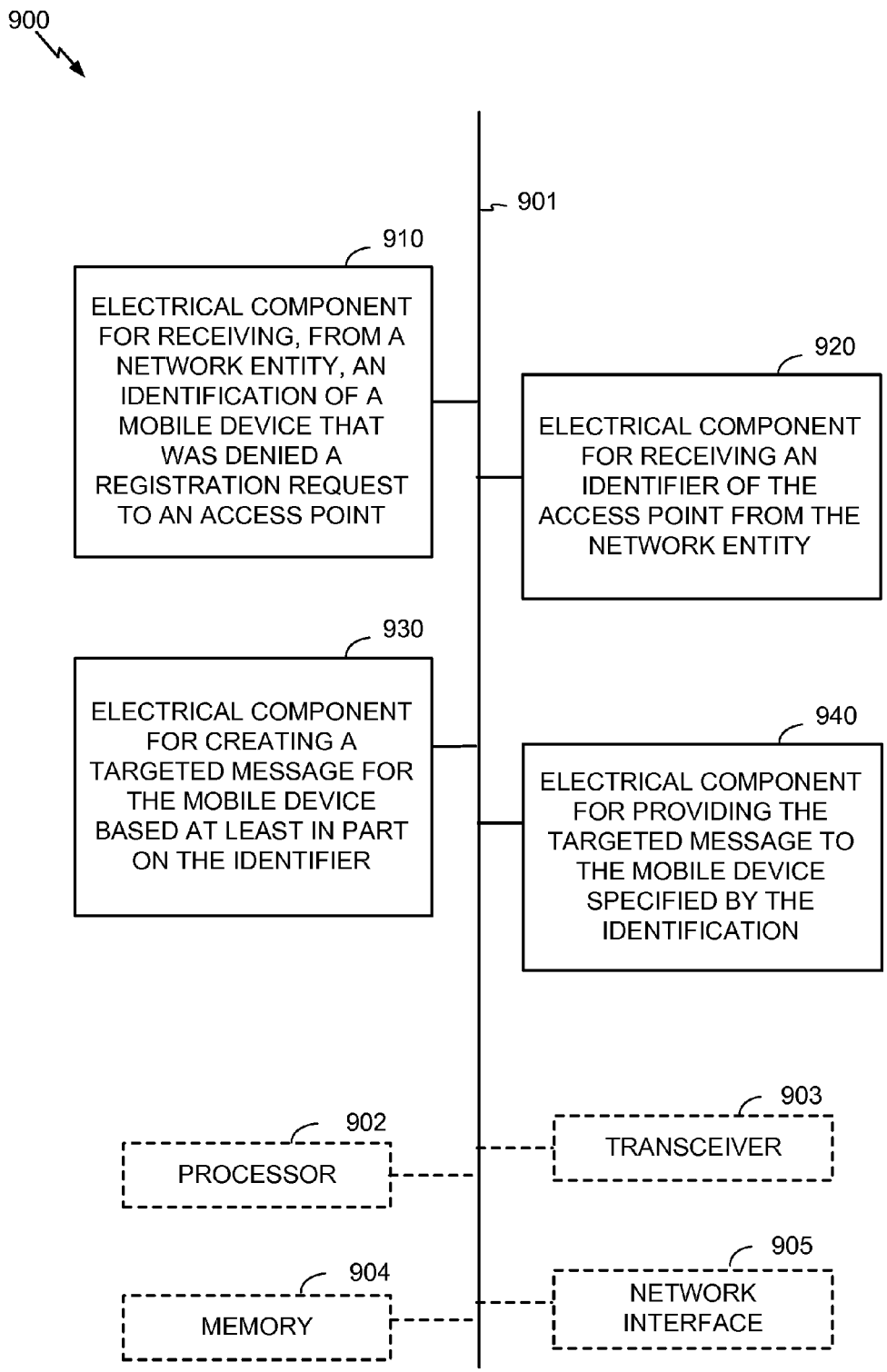
FIG. 9 shows an implementation of an apparatus in accordance with the methodology of FIG. 8.

FIG. 9 shows an implementation of an apparatus in accordance with the methodology of FIG. 8. In one implementation, apparatus 900 may include an electrical component or module 910 for receiving, from a network entity, an identification of a mobile device that was denied a registration request to an access point. The apparatus 900 may include an electrical component 920 for receiving an identifier of the access point from the network entity. The apparatus 900 may include an electrical component 930 for creating a targeted message for the mobile device based at least in part on the identifier. The apparatus 900 may include an electrical component 940 for providing the targeted message to the mobile device specified by the identification. The apparatus 900 optionally may include an electrical component 950 for determining at least one of an IP address or a phone number of the mobile device based at least in part on the identification.

For the sake of conciseness, the rest of the details regarding apparatus 900 are not further elaborated on; however, it is to be understood that the remaining features and aspects of the apparatus 900 are substantially similar to those described above with respect to apparatus 700 of FIG. 7.

Figure 10:
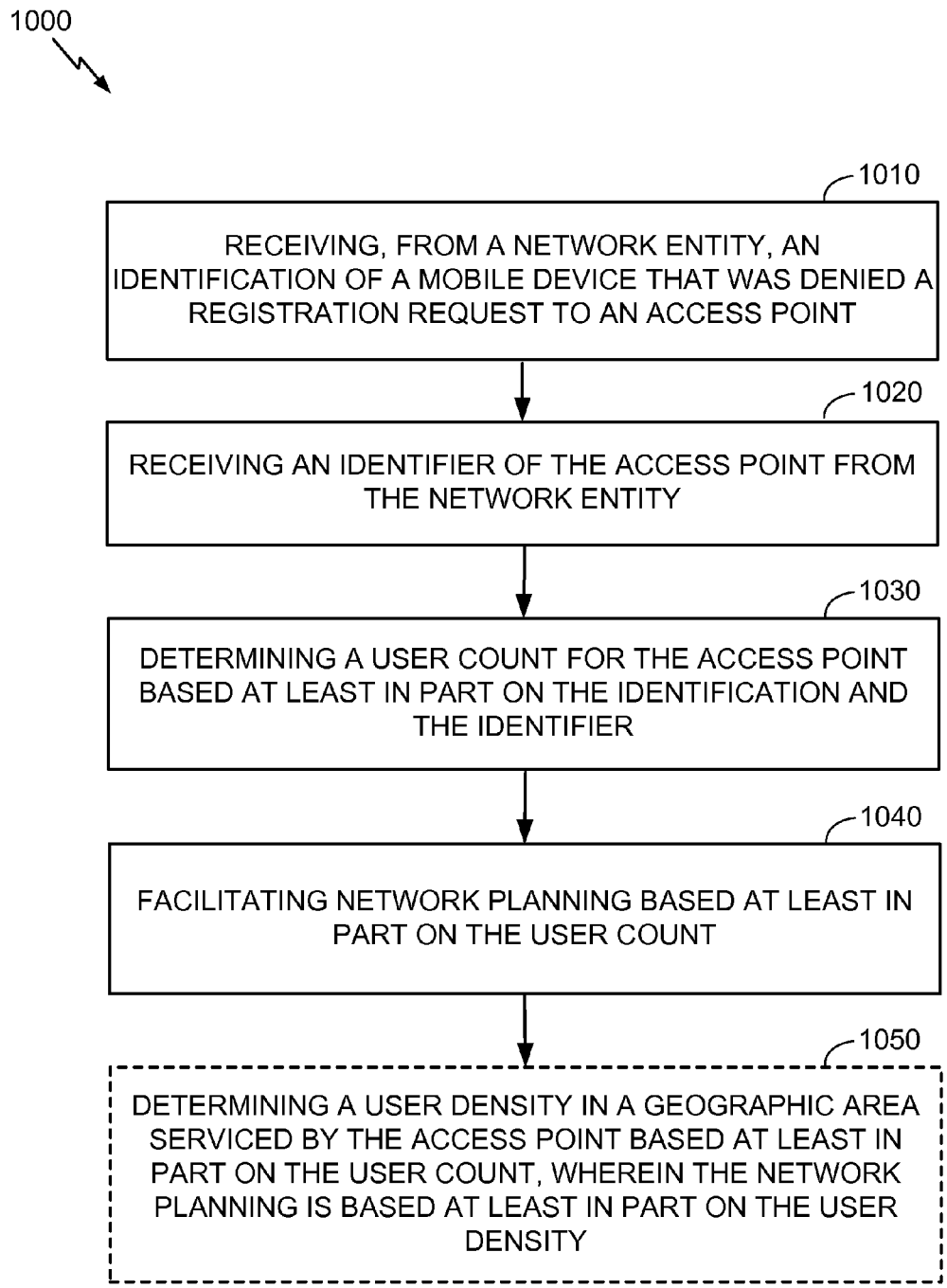
FIG. 10 illustrates aspects of a third example methodology for femtocell message delivery and network planning.

In accordance with one or more aspects of the implementations described herein, with reference to FIG. 10, there is shown a third example methodology for femtocell message delivery and network planning. In an example aspect, the method may be operable by a network entity, such as, for example, the application server 550, shown in FIG. 5.

The method 1000 may involve, at 1010, receiving, from a network entity, an identification of a mobile device that was denied a registration request to an access point. For example, the application server 550 may receive from a femtocell gateway 540, the IP address or phone number of the mobile device 510 that was denied connection to the femtocell access point 530, as shown in FIG. 5. In another example, an identification of the mobile device may be used by the application server 550 to determine the IP address or phone number identifying the mobile device 510.

The method 1000 may involve, at 1020, receiving an identifier of the access point from the network entity. The identifier of the access point may 530 include a network ID (NID), sector ID (SID) or cell ID (CID) of the access point 530, as shown in FIG. 5.

The method 1000 may involve, at 1030, determining a user count for the access point based at least in part on the identification and the identifier. The application server 550 may determine the number of users of the access point 530 by knowing the identity of the access point, as shown in FIG. 5.

The method 1000 may involve, at 1040, facilitating network planning based at least in part on the user count. In an example aspect, the network planning module 552 of the application server 550 may determine whether to deploy additional cells to improve capacity and coverage in a given area, based on the user count surpassing a specified level, as shown in FIG. 5. In another example aspect, the network planning module 552 of the application server 550 may determine whether to open private small cell base stations for public access, based on the user count surpassing a specified level.

The method 1000 may optionally involve, at 1050, determining a user density in a geographic area serviced by the access point based at least in part on the user count, wherein the network planning is based at least in part on the user density.

Figure 11:
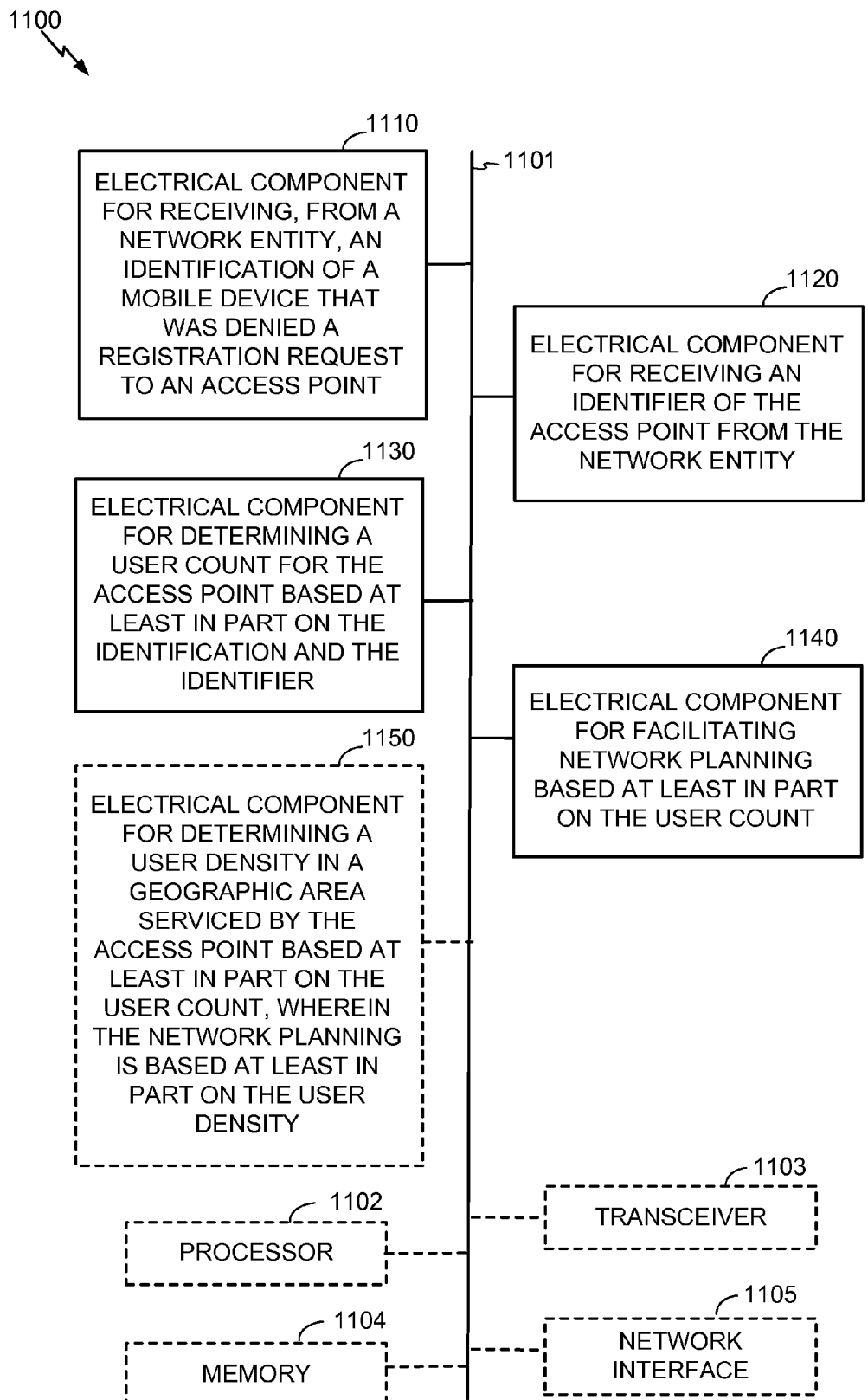
FIG. 11 shows an implementation of an apparatus in accordance with the methodology of FIG. 10.

FIG. 11 shows an implementation of an apparatus in accordance with the methodology of FIG. 10. In one implementation, apparatus 1100 may include an electrical component or module 1110 for receiving, from a network entity, an identification of a mobile device that was denied a registration request to an access point. The apparatus 1100 may include an electrical component 1120 for receiving an identifier of the access point from the network entity. The apparatus 1100 may include an electrical component 1130 for determining a user count for the access point based at least in part on the identification and the identifier. The apparatus 1100 may include an electrical component 1140 for facilitating network planning based at least in part on the user count. The apparatus 1100 may optionally include an electrical component 1140 for determining a user density in a geographic area serviced by the access point based at least in part on the user count, wherein the network planning is based at least in part on the user density.

For the sake of conciseness, the rest of the details regarding apparatus 1100 are not further elaborated on; however, it is to be understood that the remaining features and aspects of the apparatus 1100 are substantially similar to those described above with respect to apparatus 700 of FIG. 7.

Figure 12:
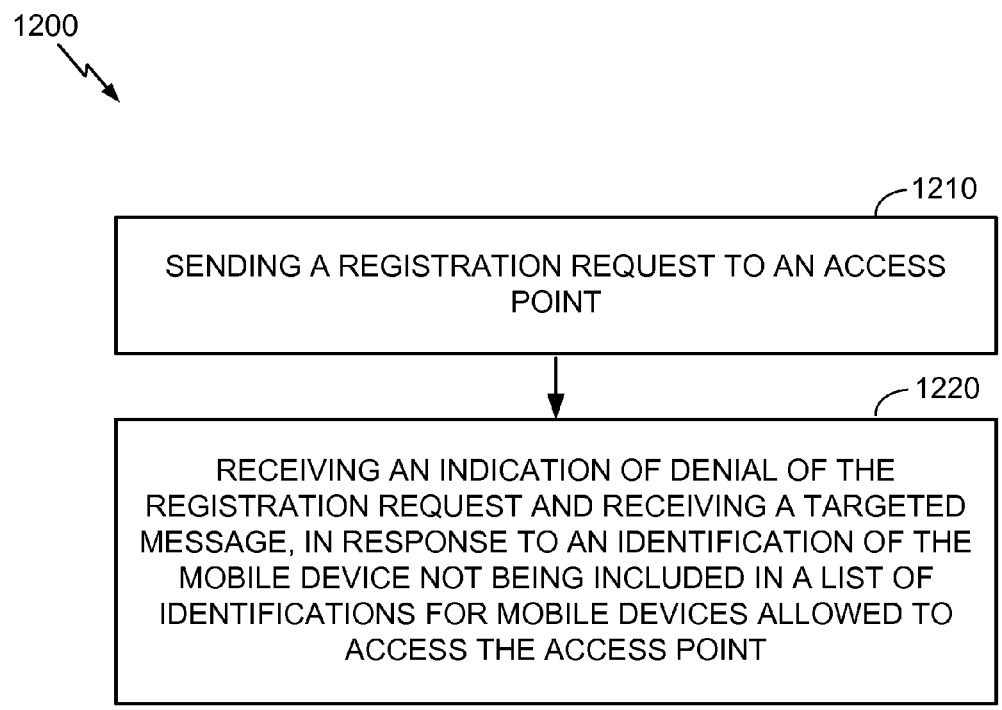
FIG. 12 illustrates aspects of a fourth example methodology for femtocell message delivery and network planning.

In accordance with one or more aspects of the implementations described herein, with reference to FIG. 12, there is shown a fourth example methodology for femtocell message delivery and network planning. In an example aspect, the method may be operable by a mobile device 510.

The method 1200 may involve, at 1210, sending a registration request to an access point. For example, the mobile device 120 may attempt to send the registration request to a femtocell access point 110, shown in FIG. 3. The processor 380 on the mobile device 120 may detect the femtocell access point 110 being in range with the antennas 352*a* through 352*r*, through the receive processor 358. The processor 380 on the mobile device 120 may send the registration request using the antennas 352*a* through 352*r*, through the transmit processor 354.

The method 1200 may involve, at 1220, receiving an indication of denial of the registration request and receiving a targeted message, in response to the identification not being included in a list of identifications for mobile devices allowed to access the access point. For example, the mobile device 410, may receive an indication of denial from the femtocell access point 430 if the mobile device 410 is not included in the CSG of the access point 430, as shown in FIG. 4. In a related aspect, the mobile device may remain connected to a macro cell 420. The mobile device 510 may receive a packet data message, a SMS message, or a MMS message from the application server 550. The targeted message may vary depending on the access point 530 that sent denied the registration request.

Figure 13:
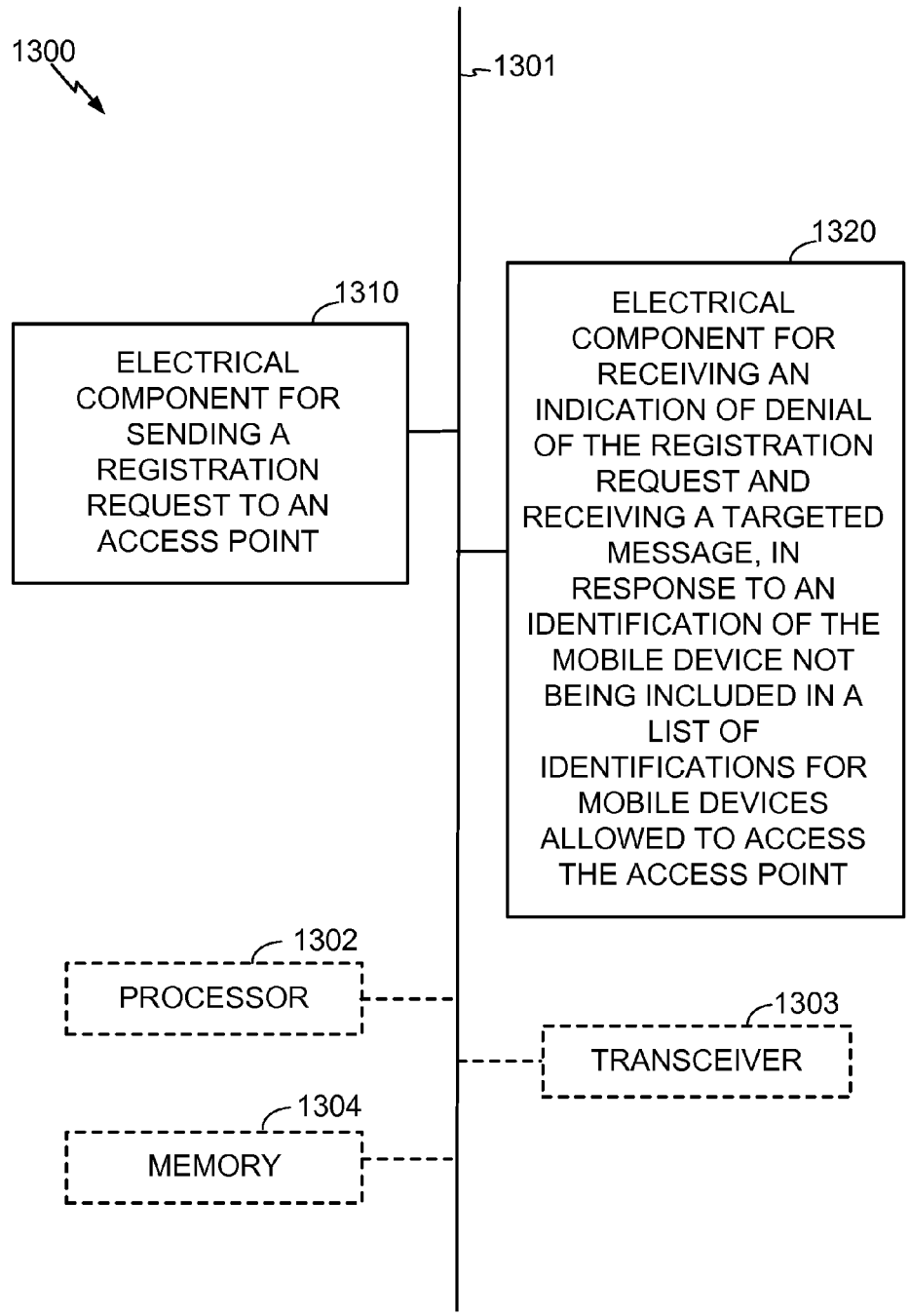
FIG. 13 shows an implementation of an apparatus in accordance with the methodology of FIG. 12.

FIG. 13 shows an implementation of an apparatus in accordance with the methodology of FIG. 12. In one implementation, apparatus 1300 may include an electrical component or module 1310 for sending a registration request to an access point. The apparatus 1300 may include an electrical component 1320 for receiving an indication of denial of the registration request, in response to the identification not being included in a list of identifications for mobile devices allowed to access the access point. The apparatus 1300 may include an electrical component 1330 for receiving a targeted message from an application server, in response to receiving the indication.

For the sake of conciseness, the rest of the details regarding apparatus 1300 are not further elaborated on; however, it is to be understood that the remaining features and aspects of the apparatus 1300 are substantially similar to those described above with respect to apparatus 700 of FIG. 7.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm operations described in connection with the disclosure herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication operable by a network entity, comprising:
   receiving a registration request for a mobile device to an access point;
   determining an identification of the mobile device based at least in part on information in the registration request;
   instructing the access point to deny the registration request and providing the identification to an application server, in response to the identification not being included in a list of identifications for mobile devices allowed to access the access point; and
   providing an identifier of the access point to the application server.

2. The method of claim 1, wherein the identification and the identifier facilitate provision of a targeted message to the mobile device by the application server.

3. The method of claim 1, wherein the list of identifications comprises a closed subscriber group (CSG) of the access point.

4. The method of claim 1, wherein the network entity comprises a femtocell gateway.

5. The method of claim 1, wherein the access point comprises a femtocell access point.

6. The method of claim 1, wherein the identification comprises at least one of an Internet Protocol (IP) address or a phone number of the mobile device.

7. The method of claim 1, wherein the identification allows the application server to determine at least one of an Internet Protocol (IP) address or a phone number of the mobile device.

8. A wireless communication apparatus, comprising:
   a radio frequency (RF) transceiver configured to:
      receive a registration request for a mobile device to an access point;
   at least one processor configured to:
      determine an identification of the mobile device based at least in part on the registration request; and instruct the access point to deny the registration request and provide the identification to an application server, in response to the identification not being included in a list of identifications for mobile devices allowed to access the access point; and a memory coupled to the at least one processor for storing data;

wherein the radio frequency (RF) transceiver is further configured to:

provide an identifier of the access point to the application server.

9. The apparatus of claim 8, wherein the identification allows the application server to determine at least one of an Internet Protocol (IP) address or a phone number of the mobile device.

10. The apparatus of claim 8, wherein the list of identifications comprises a closed subscriber group (CSG) of the access point.

11. A wireless communication apparatus, comprising:

means for receiving a registration request for a mobile device to an access point;

means for determining an identification of the mobile device based at least in part on the registration request;

means for instructing the access point to deny the registration request and for providing the identification to an application server, in response to the identification not being included in a list of identifications for mobile devices allowed to access the access point; and means for providing an identifier of the access point to the application server.

12. The apparatus of claim 11, wherein the identification allows the application server to determine at least one of an Internet Protocol (IP) address or a phone number of the mobile device.

13. The apparatus of claim 11, wherein the list of identifications comprises a closed subscriber group (CSG) of the access point.

14. A computer program product, comprising:

a non-transitory computer-readable medium comprising code for causing a computer to:

receive a registration request for a mobile device to an access point;

determine an identification of the mobile device based at least in part on the registration request;

instruct the access point to deny the registration request and provide the identification to an application server, in response to the identification not being included in a list of identifications for mobile devices allowed to access the access point; and provide an identifier of the access point to the application server.

* * * * *